E. J. STERBA & J. H. BIRCH.
MATCH SPLINT MACHINE.
APPLICATION FILED FEB. 4, 1909.

944,519.

Patented Dec. 28, 1909.

6 SHEETS—SHEET 1.

Witnesses
Frank A. Fahle
Thomas W. McMeans

Inventors
John Hays Birch
Edward J. Sterba,
By Bradford Hood
Attorneys

E. J. STERBA & J. H. BIRCH.
MATCH SPLINT MACHINE.
APPLICATION FILED FEB. 4, 1909.
944,519.
Patented Dec. 28, 1909.
6 SHEETS—SHEET 2.
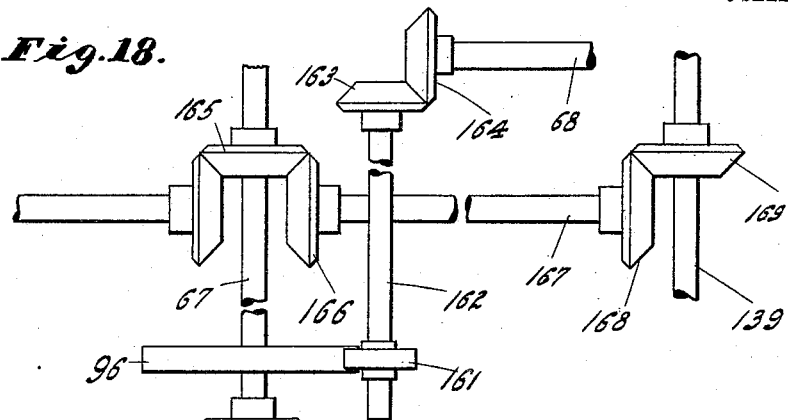
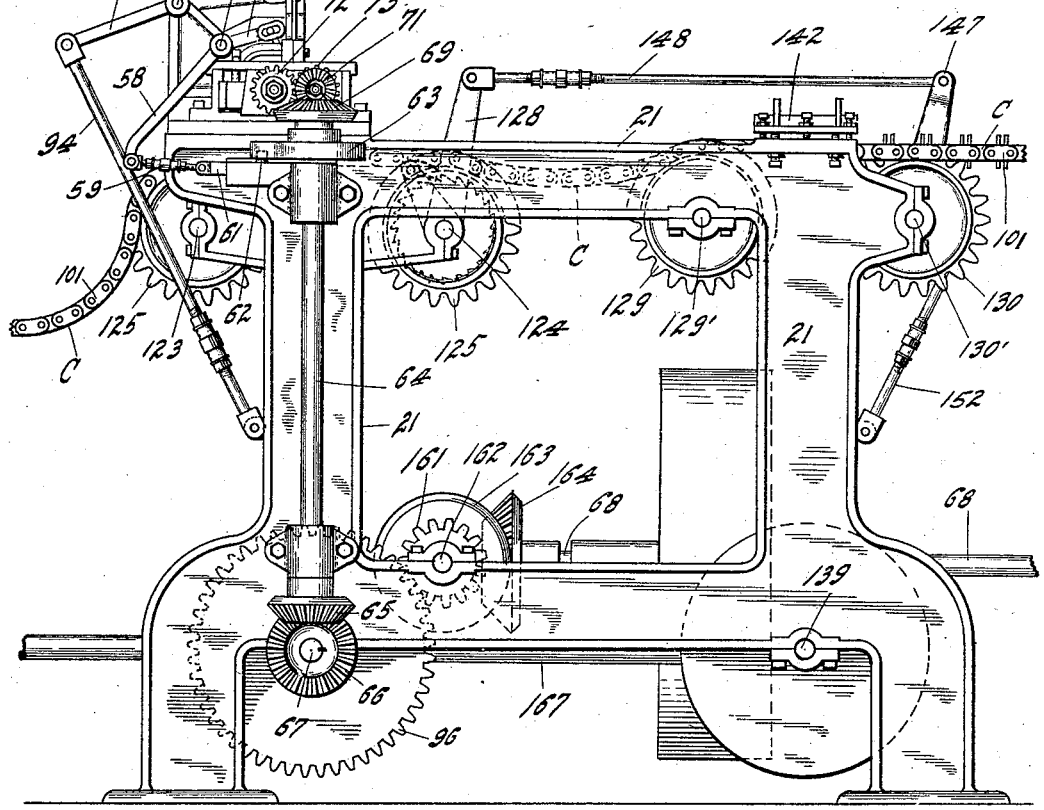

E. J. STERBA & J. H. BIRCH.
MATCH SPLINT MACHINE.
APPLICATION FILED FEB. 4, 1909.
944,519.
Patented Dec. 28, 1909.
6 SHEETS—SHEET 3.
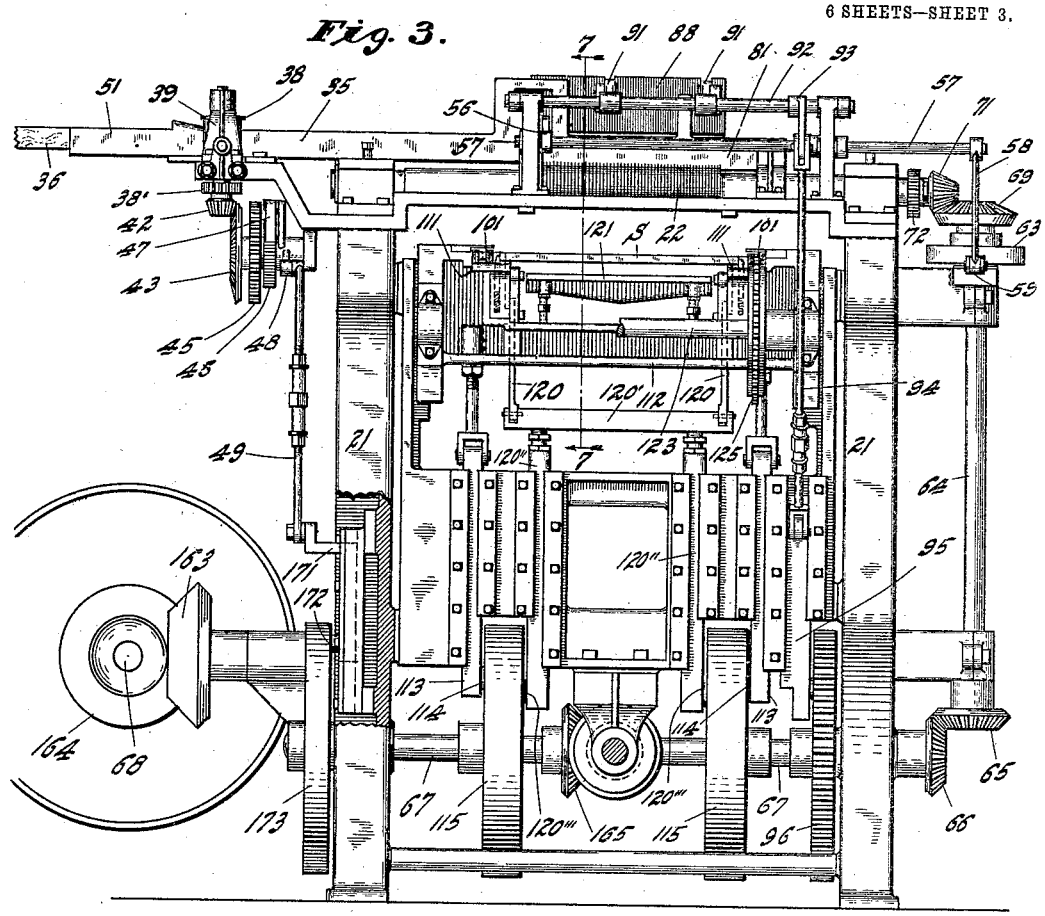
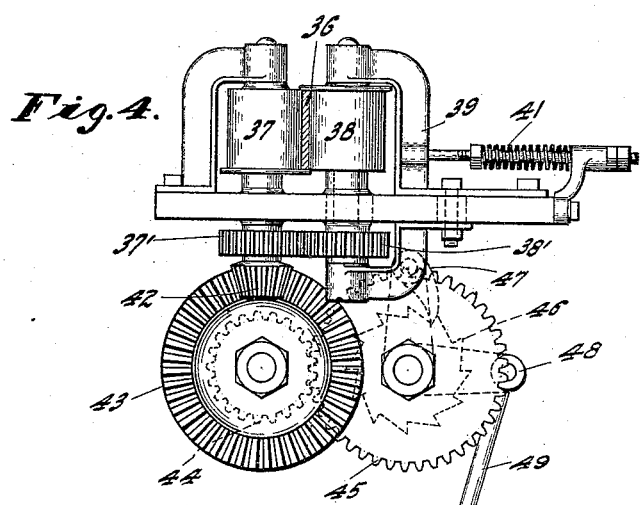
Witnesses
Frank A. Fahl
Thomas W. McMeans
Inventors
John Hays Birch,
Edward J. Sterba,
By Bradford Hood
Attorneys E. J. STERBA & J. H. BIRCH.
MATCH SPLINT MACHINE.
APPLICATION FILED FEB. 4, 1909.

944,519.

Patented Dec. 28, 1909.

6 SHEETS—SHEET 4.

Witnesses
Frank A. Fahl
Thomas W. McMeans

Inventors
John Hays Birch
Edward J. Sterba,
By Bradford Hood
Attorneys

E. J. STERBA & J. H. BIRCH.
MATCH SPLINT MACHINE.
APPLICATION FILED FEB. 4, 1909.
944,519.
Patented Dec. 28, 1909.
6 SHEETS—SHEET 5.
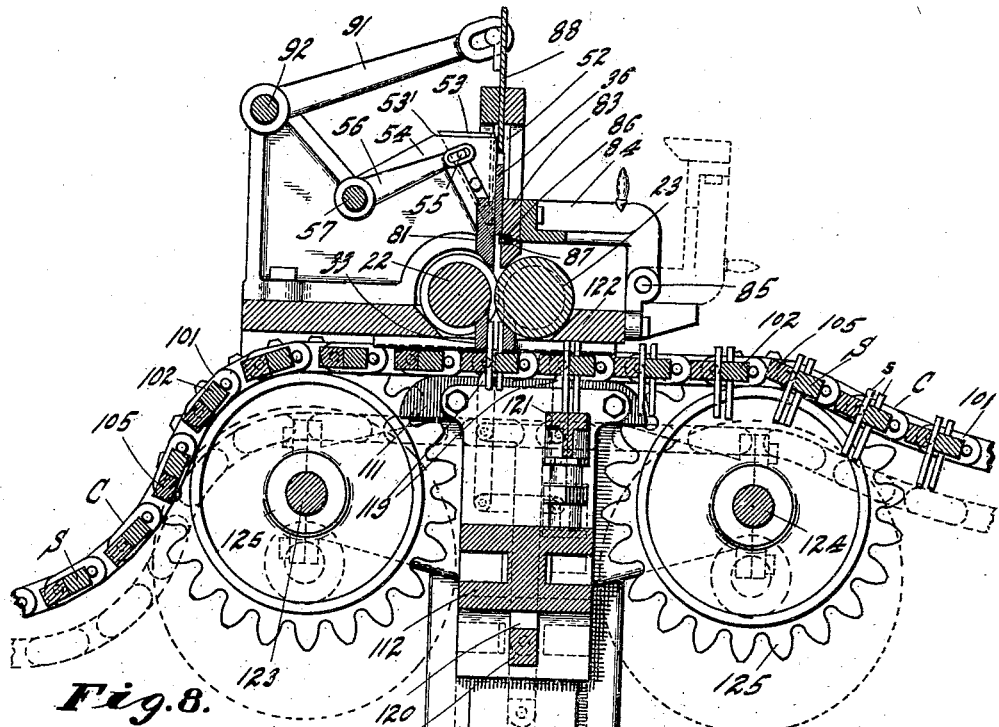
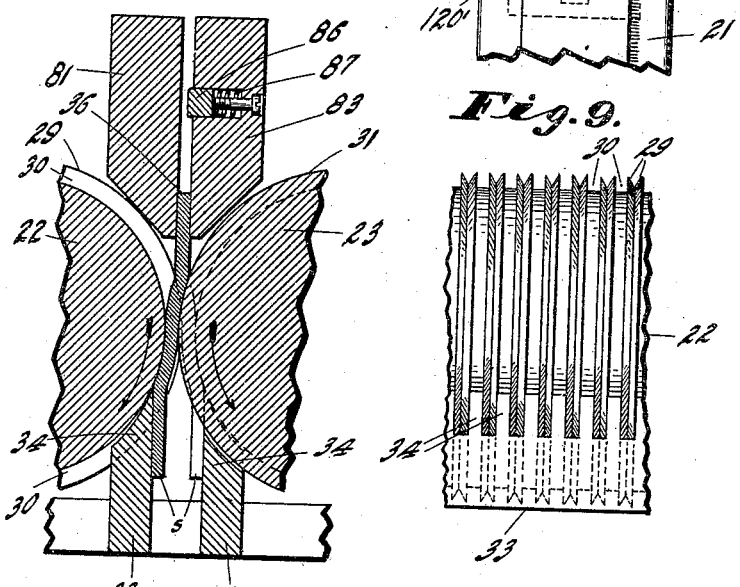
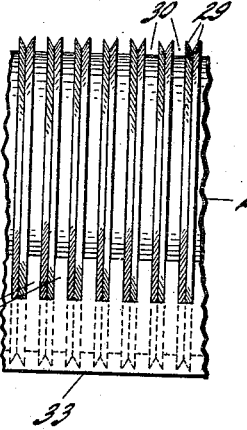
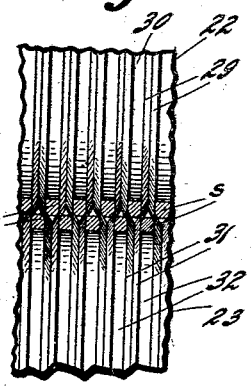
Witnesses
Frank A. Fahle
Thomas W. McMeans
Inventors
John Kays Birch
Edward J. Sterba,
By Bradford Hood
Attorneys

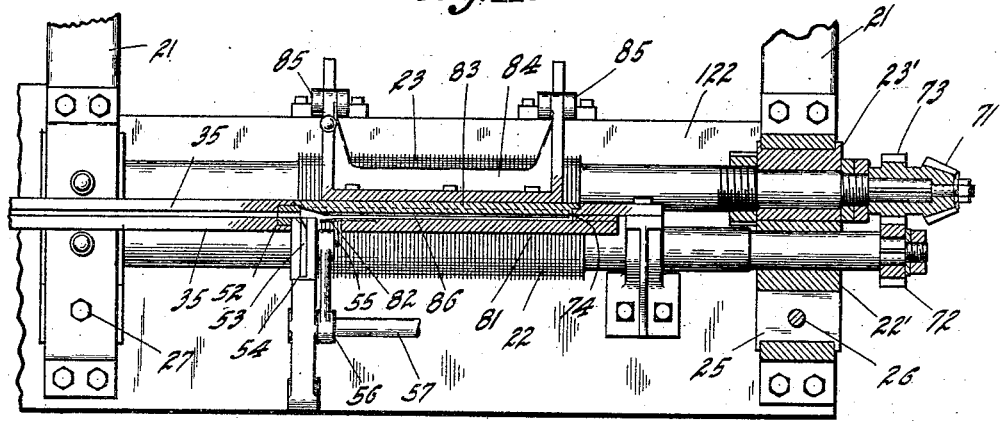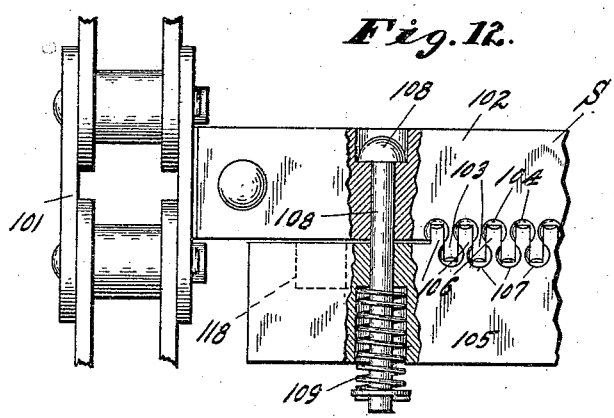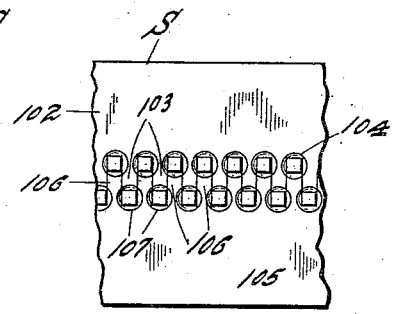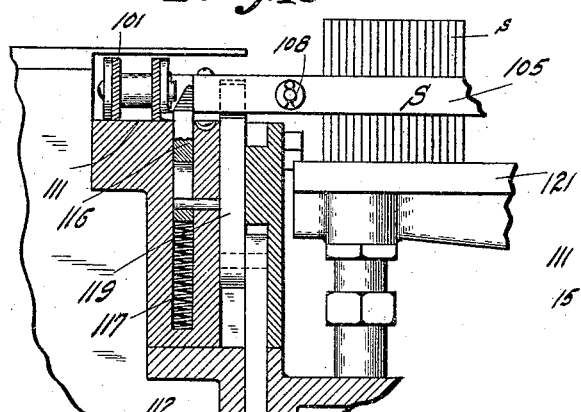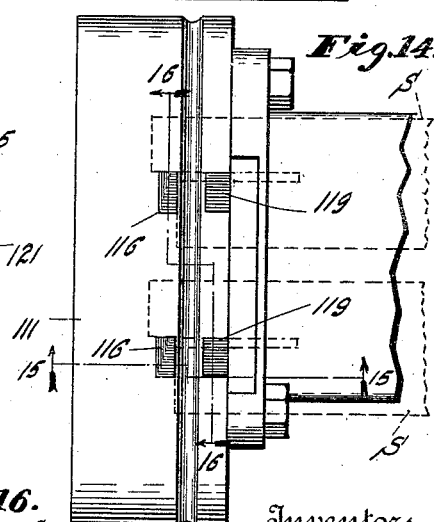

UNITED STATES PATENT OFFICE.

EDWARD J. STERBA, OF CHICAGO, ILLINOIS, AND JOHN HAYS BIRCH, OF CRAWFORDSVILLE, INDIANA, ASSIGNORS TO INDIANA MATCH COMPANY, OF CRAWFORDSVILLE, INDIANA, A CORPORATION OF INDIANA.

MATCH-SPLINT MACHINE.

944,519.   Specification of Letters Patent.   Patented Dec. 28, 1909.

Application filed February 4, 1909. Serial No. 475,981.

*To all whom it may concern:*

Be it known that we, EDWARD J. STERBA, a citizen of the United States, residing at Chicago, county of Cook, and State of Illinois, and JOHN HAYS BIRCH, a citizen of the United States, residing at Crawfordsville, in the county of Montgomery and State of Indiana, have invented certain new and useful Improvements in Match-Splint Machines, of which the following is a specification.

The object of our invention is to produce a machine capable of receiving a continuous, or substantially continuous, ribbon of veneer, or other suitable splint-forming material, of desired width and thickness and producing therefrom match splints, and loading the same automatically into a special carrier by means of which said splints may be carried through a series of operations and manipulations emerging from the said carrier as completed matches preferably in a machine (forming the subject-matter of a companion application Ser. No. 475,982) by means of which the completed matches are automatically loaded in predetermined quantities into separate receptacles; the carrier preliminarily passing through a dry kiln and frame which forms the subject-matter of another companion application Serial Number 475,983.

The accompanying drawings illustrate our invention.

Figure 1:
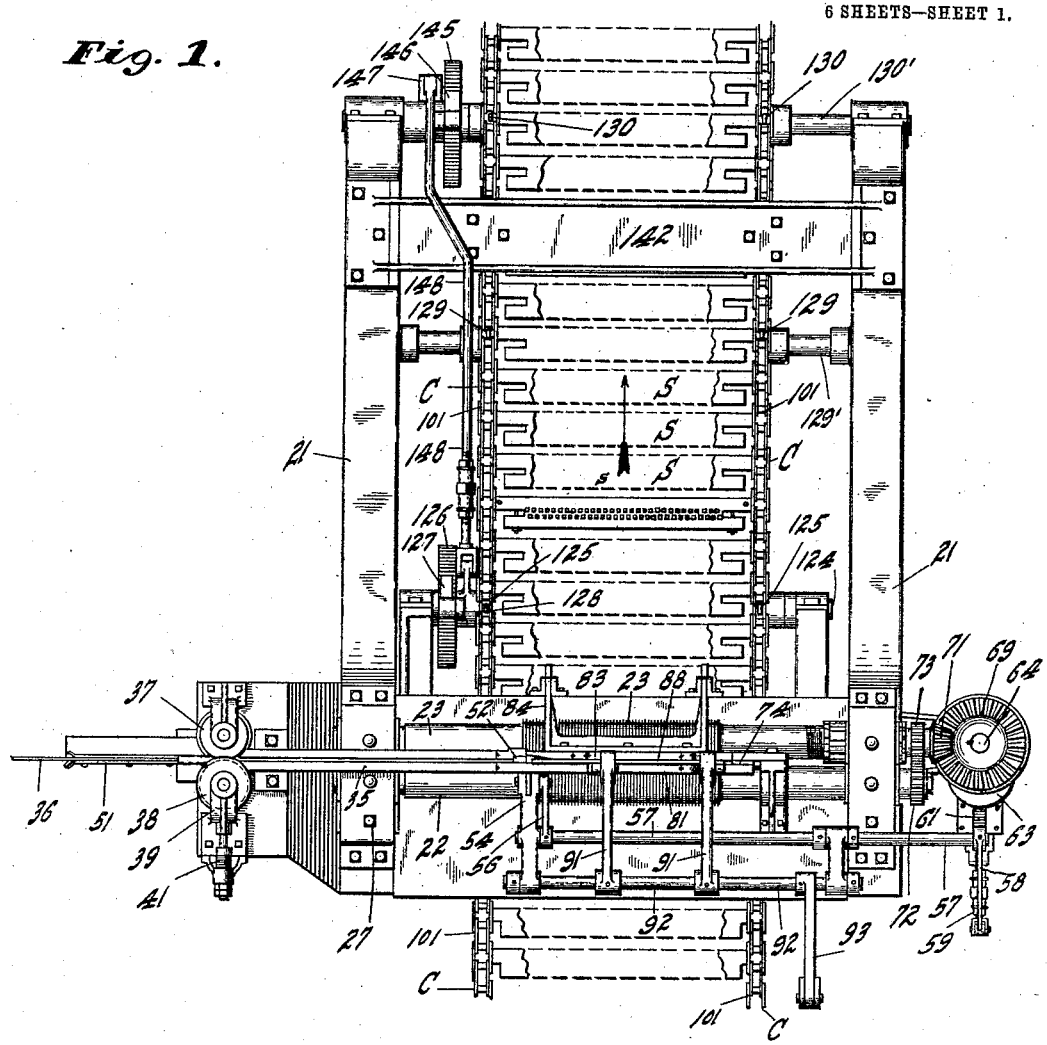
Figure 17:
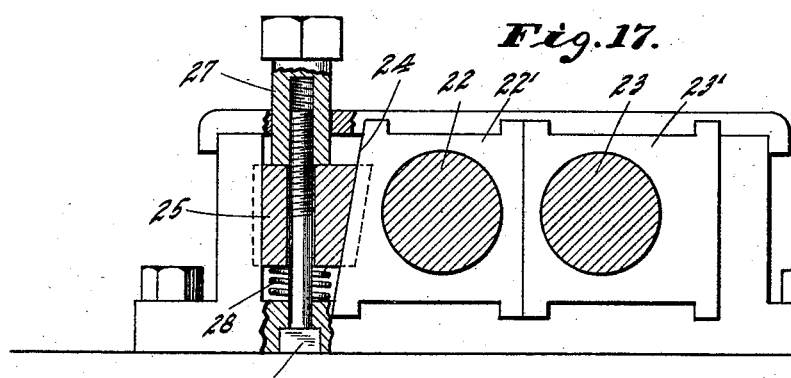
Figure 5:
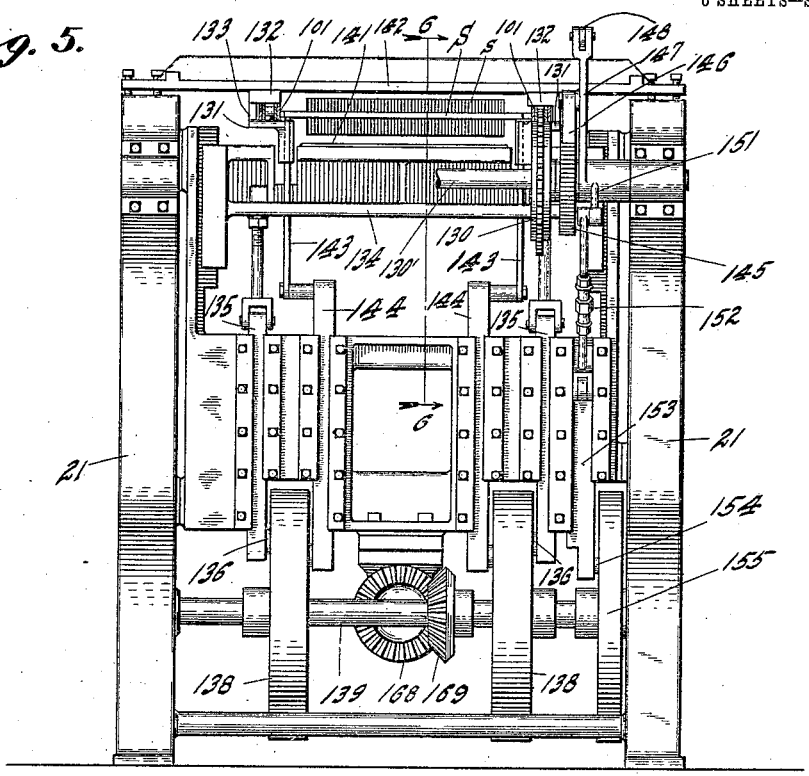
Figure 6:
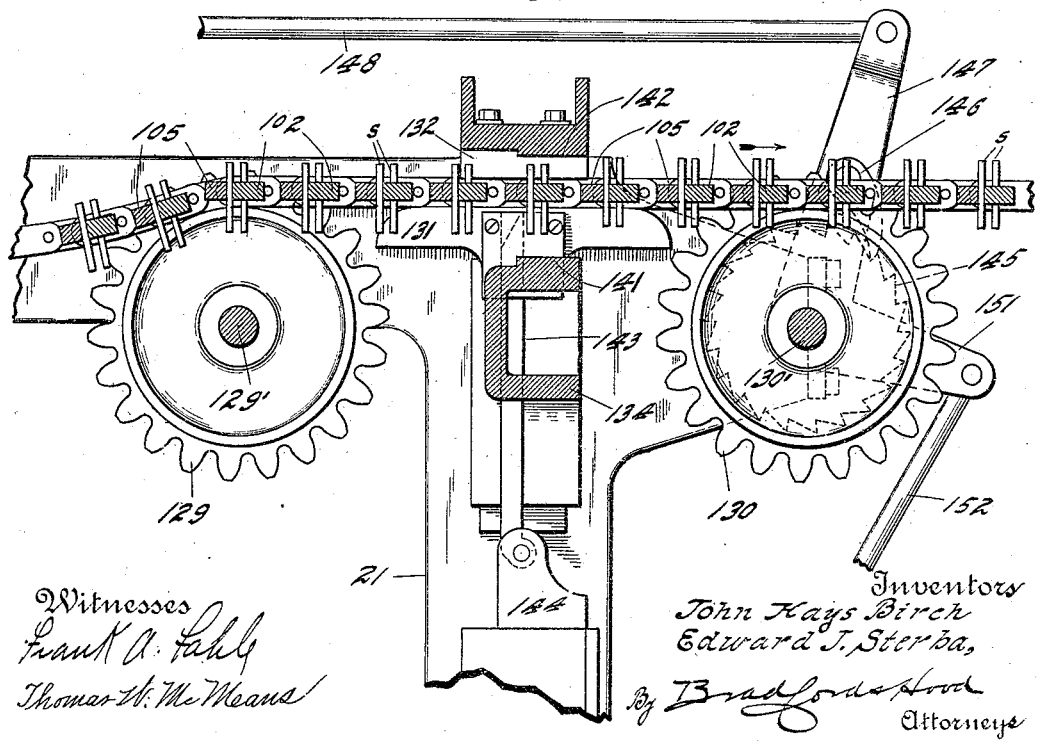

Figure 1 is a plan of the splint-producing machine; Fig. 2 a side elevation; Fig. 3 a front elevation; Fig. 4 a detail of the ribbon feeder; Fig. 5 a rear elevation; Fig. 6 a section on an enlarged scale, on line 6—6 of Fig. 5; Fig. 7 a section, on an enlarged scale, on line 7—7 of Fig. 3; Fig. 8 a sectional detail, on a still larger scale, of the parts shown in Fig. 7 and illustrating the manner of passage of the ribbon through the splint-forming rolls; Fig. 9 an elevation of a portion of one of the splint-forming rolls, showing the manner of coöperation of one of the stripper bars; Fig. 10 a fragmentary plan of the crotch of the two splint forming rolls showing the separated splints in cross section therebetween; Fig. 11 a horizontal sectional detail of the ribbon cutting mechanism and associated parts, the plane of the section at the center of the figure being above the splint-forming rolls and through the feed chute, while at the right hand end the plane of the section is substantially coincident with the axes of the splint-forming rolls; Fig. 12 a detail of one end of one of the splint carriers with no splints in position; Fig. 13 a fragmentary detail plan of a middle portion of a splint carrier with splints in position; Fig. 14 a plan detail of the mechanism for positioning and opening a splint carrier; Fig. 15 a section on line 15—15 of Fig. 14; Fig. 16 a fragmentary section on line 16—16 of Fig. 14; Fig. 17 a vertical sectional detail of the mounting for one end of the splint-forming rolls, and Fig. 18 a diagram of the driving gearing.

In the drawings, 21 indicates the main frame of the machine on which are journaled two coöperating splint-forming rolls 22 and 23. It is very necessary that these splint-forming rolls be firmly held in relation to each other and they are therefore supported at each end in bearing blocks 22' and 23' respectively. One side of the block 22' is inclined, at 24 so as to receive a wedge block 25 supported upon a stud 26 the upper end of which is threaded to receive a temper screw 27, the wedge 25 being normally urged up against the temper screw by means of a spring 28. Roll 22 is provided with a plurality of pairs of cutting flanges 29 which are straight upon their outer faces but are beveled upon their adjacent faces and the straight faces of adjacent pairs of cutters are separated to form a groove 30 having a width equal to the distance between the straight faces of a pair of cutting flanges 29. Similarly, the cutting roll 23 is provided with a plurality of pairs of cutting flanges 31 which are separated by grooves 32. The several cutting flanges must be accurately formed and spaced so that when the two rolls are brought together the cutting flanges 29 of roll 22 will enter and accurately fit in grooves 32 of roll 23 and the cutting flanges 31 of roll 23 will similarly enter and fit grooves 30 of roll 22. The amount of entrance of the cutting flanges of one roll between the cutting flanges of the other roll is only a trifle, as indicated in Fig. 8, and coöperating with each roll is a stripper bar 33 having fingers 34 which pass into the grooves 30 or 32 close to the bottom thereof, the upper edges of said fingers 34 lying a little below the axial plane of the rolls 22 and 23, as clearly shown in Fig. 8.

Arranged above the plane of the rolls 22 and 23, in the line of the crotch between said rolls, is a ribbon guide 35 which is adapted to receive the ribbon 36 from which the match splints are to be formed. This ribbon may be of any desirable material, paper, straw board, wood, etc., although we prefer a ribbon of wood veneer which has been thoroughly softened by steam, the grain of the veneer running with the width of the ribbon.

Arranged at the receiving end of guide 35, upon opposite sides thereof, are two feed rolls 37 and 38. Roll 38 is journaled in a suitable bracket 39 which is yieldingly urged toward roll 37 by means of a spring 41. The shaft of roll 37 carries a pinion 42 meshing with a gear 43 which in turn carries a gear 44 meshing with a gear 45 carried by a ratchet 46 operated by means of a pawl 47, arm 48, and link 49. The two rolls 37 and 38 are geared together by means of gears 37' and 38' respectively.

Leading to the crotch between the feed rolls 37 and 38 is a ribbon guide 51. The ribbon guide 35 may, if desired, be continued substantially integrally the entire length of those portions of rolls 22 and 23 provided with cutting flanges, but we have found in practice that there are times when there is a choking of the cutting rolls by the splint stock and that it is therefore desirable to provide means by which access may be readily had to the crotch or throat between the cutter rolls. We therefore end the guide 35 at or about the beginning of that portion of the feed rolls provided with cutting flanges and at the discharge end of the guide 35 we arrange a stationary cutter block 52 coöperating with and guiding a reciprocating knife 53 which is mounted in a suitable guide block 54. Knife 53 has a cutting edge which stands substantially vertically (Fig. 7) parallel with the plane of the ribbon but its rear edge 53' is inclined and rests upon a correspondingly inclined portion of the guide block 54 so that a downward movement of the knife will cause its cutting edge to pass across the plane of the ribbon guide to sever the ribbon. Knife 35 overlaps block 52, at the top and bottom edges of the veneer ribbon and then forces the knife to properly traverse the ribbon and cut it squarely. Knife 53 is provided with a pin 55 which lies within a slot formed in the end of an operating arm 56 carried by a rock shaft 57. Rock shaft 57 is provided with an arm 58 (Fig. 2) connected by a link 59 with a cam slide 61 having a pin 62 (dotted lines Fig. 2) which takes into the cam 63 carried by shaft 64. Shaft 64 is connected by gears 65, 66 with a shaft 67 connected by suitable gearing with the main drive shaft 68 as hereafter explained. Shaft 64, at its upper end, is provided with a gear 69 meshing with gear 71 carried by roll 23, and the two rolls 22 and 23 are geared together by means of gears 72 and 73.

In order to accurately gage the length of ribbon fed each time to the feed rolls, we arrange, at the required distance from the cutter 52, a stop 74 (Fig. 11) and the friction between the feed rolls 37 and 38 is only sufficient to drive the ribbon without buckling the same when it comes in engagement with the stop 74. We find it desirable however to accurately support the ribbon during the time it is being cut from the supply, and also while the severed portion is being fed to the splint-forming rolls. We therefore provide guiding and supporting means for the severed portion of the ribbon of such character that access may be readily had to the throat between the splint forming rolls so as to make it easily possible to clear the throat of debris. The guide referred to comprises a stationary plate 81, (Fig. 11) which, at its receiving end, is slightly flared at 82 so as to insure the entrance of the ribbon from the cutter block 52. Coöperating with the plate 81, parallel therewith and spaced therefrom a distance substantially equal to the thickness of the splint ribbon, is a plate 83 which, at its receiving end is also slightly outwardly flared. Plate 83 is carried upon the ends of an arm or bracket 84 pivoted at 85 to a suitable stationary support so that the plate 83 may be readily swung to the position indicated in dotted lines in Fig. 7, thus giving free access to the throat between the splint-forming rolls.

We have found by experience that it is absolutely essential, for the proper operation of the splint-forming rolls, that the splint ribbon be fed squarely and accurately thereto and in order to insure such feeding we mount, in the inner face of plate 83, a stop bar 86 (Figs. 7 and 8) which is yieldingly urged outwardly by a light spring 87 so that the stop bar is normally projected a part of the distance between plates 81 and 83 so that the severed portion of the splint ribbon 36 cannot possibly drop down into engagement with the two splint-forming rolls. With this arrangement, positive feeding mechanism for feeding the severed portion of the ribbon to the splint-forming rolls is necessary and we therefore provide a vertically reciprocable plunger-plate 88 adapted to be brought down into engagement with the upper edge of the severed portion of the splint ribbon and project the same downwardly past bar 86 and into the crotch between the splint-forming rolls. The plunger 88 needs to be accurately driven through its movement and we therefore provide a pair of arms 91, 91 connected at their free ends to plate 88 and at their other ends carried by a rock shaft 92 provided with an arm 93 (Fig. 2) connected by a link 94 with a cam slide 95 (Fig. 3) engaged by a cam gear 96 carried by shaft 67.

In order to automatically receive the splints after they have been cut by the splint-forming rolls, we have provided a special endless belt, C, into which the splints are automatically delivered and by means of which they may be carried through the successive mechanisms and operations by which they are formed into complete matches. This endless belt C comprises a pair of endless chains 101, 101 by means of which it may be driven, and connecting these chains, at uniform intervals, are a great number of splint-carriers S. Each splint carrier S comprises a main bar 102 having, upon one edge, a plurality of fingers 103 which are separated a distance equal to the width of the fingers and at the bases of the fingers are formed slight conical depressions 104 which facilitate the introduction of splints between the bases of the fingers. Coöperating with bar 102 is a bar 105 which is provided with a plurality of fingers 106 exactly like fingers 103 and interdigitated therewith, the crotch between the bases of the fingers 106 being provided with conical depressions 107 like the depressions 104. The tips of fingers 103 and 106 are slightly cupped, as clearly shown in Fig. 12, to match the cupping at 104 and 107. The length of the fingers 103 and 106 is substantially equal to the transverse displacement of alternate match splints produced by the interaction of the splint forming rolls 22 and 23. Each bar 102 carries, at each end, a transversely projecting pin 108 upon which the coöperating bar 105 is slidably mounted, and a spring 109 surrounds each pin 108 and urges the bar 105 toward its bar 102 with a sufficient force to properly grip the splints. The splint carriers S are successively brought to a position immediately below the stripper bars 33 (Fig. 7) and for that purpose chains 101 run over guide blocks 111 carried by a cross head 112 vertically movable in the main frame by means of cam slides 113 (Fig. 3) the pin 114 of each of which lies within a cam-groove formed in one face of a cam-disk 115 carried by shaft 67. There are two of the cam-disks 115 and the cam-grooves for operating the slides 113 are formed in the outer faces of said cam-disks. It has not been deemed necessary to illustrate the exact form of these grooves as they are ordinary cam grooves laid out in accordance with well known principles to accomplish the desired motions at the desired times.

In order to properly position the successive splint-carriers S relative to receiving position, we mount in each guide block 111, a pair of stop fingers 116 which are adapted to come up behind the two adjacent bars 102 (one of which is immediately in splint-receiving position and the other of which is passed beyond the receiving position). The stop fingers 116 are beveled on their back sides, and are normally urged upwardly by light springs 117 so that the carriers S may pass easily over them in the forward direction.

In order to separate the bars 105 from their bars 102, each bar 105 is provided, at each end, immediately adjacent bar 102, with a wedge shaped recess 118 into which may be projected a wedge shaped finger 119. There are two of these wedge shaped fingers 119 in each guide block 111 at each end of the head 112, and they are spaced apart a distance equal to the spacing between the two splint carriers S. The two fingers 119 at each end are connected by a plunger 120 (Fig. 3) and said plungers are connected by cross bar 120', with a pair of cam slides 120'' which cam slides are each provided with a cam pin 120''' passing into a suitably formed cam-groove formed in the inner adjacent faces of the cam disks 115.

The cutter rolls cannot project the splints very far into the carriers and therefore, beneath the position occupied by each splint carrier S immediately succeeding its time of reception of splints, cross head 112 is provided with an evening bar 121 (Fig. 7) upon which the splints are permitted to drop and toward which they are urged by means of a bar 122 placed above the carrier.

In order to insure accuracy of placement of the splint-carriers S relative to the splint-producing mechanism, cross head 112 is provided with a pair of parallel shafts 123, 124 upon which are mounted, at each end, sprocket wheels 125 over which the chains 101 run. Shaft 124 carries a ratchet wheel 126 (Fig. 1) engaged by a pawl 127 carried by an arm 128 journaled on shaft 124. In order to insure exact evening of the splints in the carriers, the chains 101 are passed over sprocket wheels 129 and 130 carried by a pair of shafts 129' and 130' respectively, journaled at the rear of the main frame (see Figs. 2 and 6). Between these two sets of sprocket wheels we mount a pair of chain guides 131, 131 over which the chains 101 may run and above each of these chain guides 131 we mount a coöperating guide 132 which is provided with a downwardly extending finger 133, supporting the adjacent guides 131 and serving to prevent lateral displacement of the carrier. A vertically movable cross head 134 is mounted in suitable ways at the rear end of the machine and is connected to a pair of cam slides 135 the pin 136 of each of which lies within a suitably formed cam groove formed in the outer face of one of a pair of cam disks 138, 138 both of which are carried by a shaft 139.

Cross head 134 carries a leveling bar or surface 141 adapted to engage the match splints and move them upwardly through the carriers S into engagement with a gage plate or surface 142 (Fig. 6). In order to separate the bars of each carrier S above bar 141, we provide separating fingers 143 carried by cam slides 144 the pins of which enter suitable cam grooves formed in the inner faces of cam disks 138. Shaft 130 is provided with a ratchet 145 engaged by a pawl 146 carried by an arm 147 journaled on shaft 130' and connected to arm 128 by means of a link 148. It is desirable that the shafts 124 and 129' be so placed that there will be a slight amount of slack in the carrier C as shown by the dotted lines in Fig. 2. The two shafts 124 and 130' are simultaneously advanced step-by-step by means of an arm 151 connected to arm 147 and connected by a link 152 with a cam slide 153 (Fig. 5) the pin 154 of which lies within a suitably formed cam groove in a cam disk 155 carried by shaft 139.

Shaft 67 is connected by means of cam gear 96 with a pinion 161 carried by jack shaft 162 which also carries a bevel gear 163 meshing with a bevel gear 164 carried by the main drive shaft 68, which we also use for driving the driven members of the drying mechanism which forms the subject-matter of one copending application already mentioned. Shaft 67 carries a bevel gear 165 which meshes with a gear 166 carried by a shaft 167 which, at its rear end, is provided with a bevel pinion 168 meshing with a bevel pinion 169 carried by shaft 139. Link 49 is connected to a cam slide 171 (Fig. 3) the pin 172 of which lies within a suitably formed cam groove in a cam disk 173 carried by shaft 67.

The operation is as follows:—A splint ribbon, of any suitable material, as previously mentioned, and in proper condition, is delivered to the feed rolls 37 and 38 and by them intermittently delivered to the space between plates 55 and 83 above the stop bar 86. Knife 53 is then reciprocated so as to sever a portion of the splint ribbon from the main body and this portion of the splint ribbon will lie upon or above the stop bar 86. Plunger 88 is then brought down upon the severed portion of the splint ribbon and at its first action evens the ribbon up upon the stop bar 86 so that the lower edge of the ribbon is in exact parallelism with the axes of the splint-forming rolls. Further downward movement of plunger 88 projects the severed portion of the splint ribbon squarely into the crotch between the splint-forming rolls (bar 86 serving to prevent any dropping of the ribbon) and drives the ribbon downward between the rolls until the rolls themselves have taken a sufficient grip upon the ribbon to finish the propulsion thereof. The ribbon passes through between the splint-forming rolls in the manner shown in Fig. 8, the cutters of the rolls cutting the ribbon, without waste of material into splints which are alternately laterally displaced from the original plane of the ribbon. As the splints pass downward with the rolls they stick in the grooves thereof and are engaged by the stripper fingers 34 and by them pried out of the grooves 31 and 32, the action and condition of material of the splint being such that the splints s are straightened upon the stripping faces of the stripper bars 33 as clearly shown in Fig. 8. Before the splints s have passed through the splint-forming rolls, one of the splint carriers S has been brought immediately beneath the stripper bars (as clearly shown in Fig. 7), by advancement of gears 125 and an upward movement of the cross head 112, and an upward movement of cross bar 120' has projected fingers 119 upward into the tapered recesses 118 of said splint carrier S and separated its bar 105 from bar 102 by an amount slightly in excess of the cross dimension of the lower ends of the splints s, so that the splints s, as they are driven down by the rotation of the splint forming rolls, are propelled into the spaces between the roots of the fingers 103 and 106. Thereupon fingers 119 are withdrawn, cross head 112 is lowered so as to withdraw the splints from between the stripper bars, shaft 124 given an advancement sufficient to bring a new splint carrier S into place, and the operation is repeated the splint-forming rolls being continuously rotated during this time. On the repetition of the described operation, the splint carrier S, which has been previously filled, is operated upon by the forward set of fingers 119 so that, as cross head 112 is moved upwardly and fingers 119 are moved upwardly the splints in the previously filled splint carrier S are released so that they may drop down upon the leveling bar 121, being urged to that position by the plate 122, as cross head 112 rises. The forward set of pins 119 is a trifle thicker than the first set so that the separation of the members of the previously filled splint carrier S is slightly greater than the separation of the members of the carrier which is being filled. The operation described is repeated in rapid succession and when the first-filled splint carrier S reaches a point above the leveling bar 141, fingers 143 are projected into notches 118 of said splint carrier so as to free the splints and the leveling bar 141 is projected upwardly to engage said splints and drive them upwardly through the splint carrier into leveling engagement with the surface 142. From this point the belt C, comprising the filled splint carriers S, is carried onward through drying, paraffining, dipping and further drying mechanism, the assemblage of which forms the subject-matter of one of the companion applications already mentioned and thence to an unloading machine, (which forms the subject-matter of the other companion application already mentioned), and thence returns to the splint-forming mechanism.

We claim as our invention:—

1. A match machine comprising, a pair of splint-forming rolls having interdigitated cutting flanges, a guide arranged above the crotch of said rolls and adapted to receive a length of splint material, a stop arranged in said guide to normally prevent the splint material from passing to the rolls, and means for positively projecting said splint material past said stop into engagement by the splint-forming rolls.

2. A splint-forming machine comprising, a pair of splint-forming rolls having interdigitated cutting flanges, a guideway arranged above the crotch of said rolls, a stop bar yieldingly projected into said guideway and arranged parallel with the axes of the rolls, and means for positively projecting lengths of splint material through said guide past said stop bar and into engagement with the splint-forming rolls.

3. A splint-forming machine comprising, a pair of splint-forming rolls having interdigitated cutting flanges, a guideway arranged above the crotch of said rolls, a stop bar yieldingly projected into said guideway and arranged parallel with the axes of the rolls, means for intermittently feeding a ribbon of splint material into said guide, means for severing predetermined lengths from the inner end of such ribbon, and means for positively projecting such predetermined lengths of splint material through said guide past said stop bar and into engagement with the splint-forming rolls.

4. In a splint-forming machine, the combination, with a pair of splint-forming rolls comprising interdigitated cutting flanges, of a material guide arranged adjacent the receiving crotch of said rolls, said material guide comprising two opposed members one withdrawable from the other, a stop bar yieldingly mounted in and projected from the inner face of one of said members, and a movable support for said movable member whereby said member may be readily withdrawn to give free access to the receiving throat or crotch between the splint-forming rolls.

5. The combination, with a splint forming mechanism, of a carrier comprising a plurality of splint carrying members each comprising a pair of bars having interdigitated splint receiving fingers and means for clamping said bars together, a movable support comprising members for receiving the splint carrier, means for moving the splint carrier step by step to bring the successive members into alinement with splint forming mechanism, the said splint forming mechanism, means for moving the carrier support with its carrier toward and from the splint forming mechanism, means for separating the bars of each splint carrier lengthwise of its interdigitated fingers to receive the splints, and means for engaging, supporting and adjusting the splints relative to the splint carrier when the fingers are separated.

6. A splint forming machine comprising a splint forming mechanism, a plurality of splint receivers adapted to receive splints from the forming mechanism, means for moving said receivers successively to alinement with the splint forming mechanism and beyond, means for moving said receivers toward and from the splint forming mechanism in a direction at an angle to the alining movement, means for temporarily releasing the splints in the splint receivers beyond splint receiving position, means arranged in conjunction with the splint receiving means for supporting and leveling the splints within their receivers during the movement of the receivers to and from the splint forming mechanism, a second splint releasing means arranged at a farther point beyond the receiving position, and a second leveling means arranged in conjunction with the second releasing means for re-leveling the splints within their receivers.

7. In a splint forming mechanism, a splint carrier comprising a pair of endless belts, a plurality of connecting cross bars between said belts, each of said cross bars carrying a plurality of separated fingers, a coöperating bar mounted upon each of said first mentioned cross bars and each carrying a plurality of separated fingers interdigitated with the fingers of the carrying bar, connections between each cross bar and its coöperating bar permitting movement of the coöperating bar upon its carrying cross bar in a line substantially parallel with the fingers, and springs for yieldingly holding the coöperating bar upon its carrying cross bar with the fingers interdigitated to the greatest extent.

8. In a splint forming mechanism, a splint carrier comprising a pair of endless belts, a plurality of connecting cross bars between said belts, each of said cross bars carrying a plurality of separated fingers, a coöperating bar mounted upon each of said first mentioned cross bars and each carrying a plurality of separated fingers interdigitated with the fingers of the carrying bar, the receiving faces of said bars being cupped between the fingers at the roots thereof, connections between each cross bar and its coöperating bar permitting movement of the coöperating bar upon its carrying cross bar in a line substantially parallel with the fingers, and springs for yieldingly holding the coöperating bar upon its carrying cross bar with the fingers interdigitated to the greatest extent.

9. The combination, in a splint forming mechanism, of a pair of splint forming rolls having interdigitated cutting flanges, a pair of stripper bars each having fingers interdigitated with the cutting flanges of a roll, said stripper bars having adjacent faces adapted to receive and straighten the forming splints, a carrier comprising a plurality of splint receiving members each consisting of a pair of bars having interdigitated splint-receiving fingers and relatively movable in the line of interdigitation, means for presenting said splint carriers successively into alinement with the forming splints, means for moving the splint receiving members toward and from the splint forming rolls, means for separating the bars of each carrier when in splint receiving position, means for clamping said bars of the carrier upon the splints when the separating means is withdrawn.

10. The combination, in a splint forming mechanism, of a pair of splint forming rolls having interdigitated cutting flanges, a pair of stripper bars each having fingers interdigitated with the cutting flanges of a roll, said stripper bars having adjacent faces adapted to receive and straighten the forming splints, a carrier comprising a plurality of splint receiving members each consisting of a pair of bars having interdigitated splint-receiving fingers and relatively movable in the line of interdigitation, means for presenting said splint carriers successively into alinement with the forming splints, means for moving the splint receiving members toward and from the splint forming rolls, means for separating the bars of each carrier when in splint receiving position, means for clamping said bars of the carrier upon the splints when the separating means is withdrawn, a splint support arranged beneath the splint carriers beyond splint receiving position, means for again separating the bars of each carrier when in conjunction with said splint support, and means coöperating with said splint support for leveling the splints within the carrier.

11. The combination, in a splint forming mechanism, of a pair of splint forming rolls having interdigitated cutting flanges, a pair of stripper bars each having fingers interdigitated with the cutting flanges of a roll, said stripper bars having adjacent faces adapted to receive and straighten the forming splints, a carrier comprising a plurality of splint receiving members each consisting of a pair of bars having interdigitated splint-receiving fingers and relatively movable in the line of interdigitation, means for presenting said splint carriers successively into alinement with the forming splints, means for moving the splint receiving members toward and from the splint forming rolls, means for separating the bars of each carrier when in splint receiving position, means for clamping said bars of the carrier upon the splints when the separating means is withdrawn, a third separating means arranged beyond the second separating means to again act upon the bars of the carrier, and a second leveling means arranged in conjunction with said third separating means.

12. The combination, in a splint forming mechanism, of a pair of splint forming rolls having interdigitated cutting flanges, a pair of stripper bars each having fingers interdigitated with the cutting flanges of a roll, said stripper bars having adjacent faces adapted to receive and straighten the forming splints, a carrier comprising a plurality of splint receiving members each consisting of a pair of bars having interdigitated splint-receiving fingers and relatively movable in the line of interdigitation, means for presenting said splint carriers successively into alinement with the forming splints, means for moving the splint receiving members toward and from the splint forming rolls, means for separating the bars of each carrier when in splint receiving position, means for clamping said bars of the carrier upon the splints when the separating means is withdrawn, a splint support arranged beneath the splint carriers beyond splint receiving position, means for again separating the bars of each carrier when in conjunction with said splint support, means coöperating with said splint support for leveling the splints within the carrier, a third separating means arranged beyond the second separating means to again act upon the bars of the carrier, and a second leveling means arranged in conjunction with said third separating means.

In witness whereof, we have hereunto set our hands and seals at Crawfordsville, Indiana, that 26 day of January, A. D. one thousand nine hundred and nine.

EDWARD J. STERBA. [L. S.]
JOHN HAYS BIRCH. [L. S.]

Witnesses:
E. L. JOHNSON,
W. A. SIDENER.